(12) United States Patent
Hsieh et al.

(10) Patent No.: US 8,907,023 B2
(45) Date of Patent: Dec. 9, 2014

(54) POLYSILOXANE COMPOUND, MODIFIED CONJUGATED DIENE-VINYL AROMATIC COPOLYMER AND PREPARING METHOD THEREOF

(71) Applicant: Chi Mei Corporation, Tainan (TW)

(72) Inventors: Kuan-Lin Hsieh, Tainan (TW); Kuei-Lun Cheng, Tainan (TW); Chih-Cheng Lee, Tainan (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 13/961,846

(22) Filed: Aug. 7, 2013

(65) Prior Publication Data

US 2014/0187723 A1    Jul. 3, 2014

(30) Foreign Application Priority Data

Dec. 28, 2012    (TW) .............................. 101151077 A

(51) Int. Cl.
| | | |
|---|---|---|
| *C08C 19/25* | (2006.01) | |
| *C08F 8/42* | (2006.01) | |
| *C08G 77/04* | (2006.01) | |
| *C08C 19/44* | (2006.01) | |

(52) U.S. Cl.
CPC . *C08C 19/25* (2013.01); *C08F 8/42* (2013.01); *C08G 77/04* (2013.01); *C08C 19/44* (2013.01)
USPC ........... 525/342; 428/403; 428/404; 428/405; 525/100; 525/105; 526/335; 526/340; 526/346; 526/347; 528/25; 528/27; 528/28; 528/31; 528/38

(58) Field of Classification Search
None
See application file for complete search history.

(56) References Cited

U.S. PATENT DOCUMENTS

| | | | |
|---|---|---|---|
| 4,520,177 A | 5/1985 | Jenkins | |
| 4,544,718 A | 10/1985 | Yeh et al. | |
| 5,064,910 A | 11/1991 | Hattori et al. | |
| 5,070,150 A | 12/1991 | Hopper | |
| 5,220,045 A | 6/1993 | Knauf et al. | |
| 5,652,310 A * | 7/1997 | Hsu et al. | 525/331.9 |
| 6,525,110 B1 * | 2/2003 | Yatsuyanagi et al. | 523/212 |
| 2003/0100652 A1* | 5/2003 | Kim et al. | 524/430 |
| 2013/0012651 A1* | 1/2013 | Sasajima et al. | 524/575 |

FOREIGN PATENT DOCUMENTS

TW    I273106    2/2007

\* cited by examiner

*Primary Examiner* — Mark Zimmer
(74) *Attorney, Agent, or Firm* — Jianq Chyun IP Office

(57) ABSTRACT

The present invention relates to a polysiloxane compound having a structure represented by formula 1:

formula 1

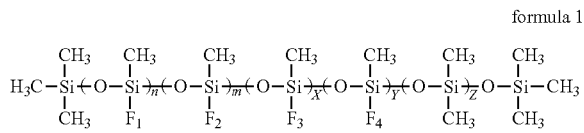

wherein each of $F_1$, $F_2$, $F_3$ and $F_4$ is individually selected from one of a first group, a second group, a third group and a fourth group, the first group is selected from a $C_2$~$C_{10}$ hydrocarbon group having amino group(s), a $C_2$~$C_{10}$ hydrocarbon group having epoxy group(s), a $C_2$~$C_{10}$ hydrocarbon group having carbonyl group(s) or a $C_2$~$C_{10}$ hydrocarbon group having alkoxy group(s), the second group is a $C_2$~$C_{10}$ hydrocarbon group having amino group(s), the third group is selected from a $C_2$~$C_{10}$ hydrocarbon group having epoxy group(s), a $C_2$~$C_{10}$ hydrocarbon group having carbonyl group(s), a $C_2$~$C_{10}$ hydrocarbon group having SiCl group(s) or a $C_2$~$C_{10}$ hydrocarbon group having alkoxy group(s), the fourth group is selected from a $C_2$~$C_{10}$ hydrocarbon group having aryl group(s) or a $C_2$~$C_{10}$ hydrocarbon group having alkoxy group(s).

19 Claims, No Drawings

POLYSILOXANE COMPOUND, MODIFIED CONJUGATED DIENE-VINYL AROMATIC COPOLYMER AND PREPARING METHOD THEREOF

CROSS-REFERENCE TO RELATED APPLICATION

This application claims the priority benefit of Taiwan application serial no. 101151077, filed on Dec. 28, 2012. The entirety of the above-mentioned patent application is hereby incorporated by reference herein and made a part of this specification.

BACKGROUND OF THE INVENTION

1. Technical Field

The present invention relates to a polysiloxane compound, a modified conjugated diene-vinyl aromatic hydrocarbon copolymer and the preparing method thereof.

2. Background

In general, the conjugated diene-vinyl aromatic hydrocarbon copolymers may be used for preparing tires. For the considerations of energy saving, it requires the tires having lower rolling resistance to achieve the purpose of economical fuel consumption. Also, for the concerns of traffic safety, the tires are required to have excellent skid resistance.

To increase the hardness, the tensile strength, the abrasion resistance and the tear resistance of the tires, carbon black is usually added to the conjugated diene-vinyl aromatic hydrocarbon copolymers as the reinforcing agent for various rubbers. In addition, silica may be added to the tires, by way of special cooling effects of silica, to lower the high temperatures of the tires during rolling, thereby reducing the consumption of the kinetic energy that is converted into heat and delivering the power entirely to the tire. As the body temperature of the tires is not over-heated, the rolling resistance of the tires can be reduced. However, it is unlikely for carbon black and silica to be uniformly dispersed in the conjugated diene-vinyl aromatic hydrocarbon copolymers, the mixing compatibility of the carbon black and silica with the conjugated diene-vinyl aromatic hydrocarbon copolymers is not satisfactory.

The conventional practice is to add the polysiloxane type modifier to the conjugated diene-vinyl aromatic hydrocarbon copolymers to obtain the modified conjugated diene-vinyl aromatic hydrocarbon copolymers. However, the industry is eager to obtain the modified conjugated diene-vinyl aromatic hydrocarbon copolymer having high mixing compatibility with carbon black. Also, it is desirable to produce the tires made of the above-mentioned copolymers but having low rolling resistance and excellent skid resistance.

SUMMARY

The embodiment of the present invention provides a polysiloxane compound, applicable for modifying the conjugated diene-vinyl aromatic copolymer(s).

The embodiment of the present invention provides a polysiloxane compound having a structure represented by formula 1:

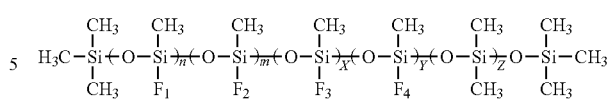

formula 1

Each of $F_1$, $F_2$, $F_3$ and $F_4$ is individually selected from one of a first group, a second group, a third group and a fourth group, and each of $F_1$, $F_2$, $F_3$ and $F_4$ belongs to a different group; the first group is selected from a $C_2$~$C_{10}$ hydrocarbon group having at least one amino group, a $C_2$~$C_{10}$ hydrocarbon group having at least one epoxy group, a $C_2$~$C_{10}$ hydrocarbon group having at least one carbonyl group or a $C_2$~$C_{10}$ hydrocarbon group having at least one alkoxy group; the second group is a $C_2$~$C_{10}$ hydrocarbon group having at least one amino group; the third group is selected from a $C_2$~$C_{10}$ hydrocarbon group having at least one epoxy group, a $C_2$~$C_{10}$ hydrocarbon group having at least one carbonyl group, a $C_2$~$C_{10}$ hydrocarbon group having at least one SiCl group or a $C_2$~$C_{10}$ hydrocarbon group having at least one alkoxy group; the fourth group is selected from a $C_2$~$C_{10}$ hydrocarbon group having at least one aryl group or a $C_2$~$C_{10}$ hydrocarbon group having at least one alkoxy group; n is an integer from 1 to 60, m is an integer from 1 to 60, X is an integer from 1 to 60, Y is an integer from 1 to 60, and Z is an integer from 0 to 300. The molar ratio of the first group:the second group:the third group:the fourth group is 1~40:1~30:0.5~10:45~90.

The embodiment of the present invention provides a method for producing a modified conjugated diene-vinyl aromatic copolymer. At first, an organic alkali metal compound, conjugated diene monomers and vinyl aromatic hydrocarbon monomers are polymerized to obtain a conjugated diene-vinyl aromatic copolymer. The weight ratio of the conjugated diene monomers and the vinyl aromatic hydrocarbon monomers ranges from 2:1 to 5:1. The conjugated diene-vinyl aromatic copolymer is reacted with a polysiloxane compound to form the modified conjugated diene-vinyl aromatic copolymer, wherein the polysiloxane compound having a structure represented by formula 1:

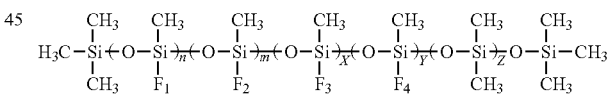

formula 1

Each of $F_1$, $F_2$, $F_3$ and $F_4$ is individually selected from one of a first group, a second group, a third group and a fourth group, and each of $F_1$, $F_2$, $F_3$ and $F_4$ belongs to a different group; the first group is selected from a $C_2$~$C_{10}$ hydrocarbon group having at least one amino group, a $C_2$~$C_{10}$ hydrocarbon group having at least one epoxy group, a $C_2$~$C_{10}$ hydrocarbon group having at least one carbonyl group or a $C_2$~$C_{10}$ hydrocarbon group having at least one alkoxy group; the second group is a $C_2$~$C_{10}$ hydrocarbon group having at least one amino group; the third group is selected from a $C_2$~$C_{10}$ hydrocarbon group having at least one epoxy group, a $C_2$~$C_{10}$ hydrocarbon group having at least one carbonyl group, a $C_2$~$C_{10}$ hydrocarbon group having at least one SiCl group or a $C_2$~$C_{10}$ hydrocarbon group having at least one alkoxy group; the fourth group is selected from a $C_2$~$C_{10}$ hydrocarbon group having at least one aryl group or a $C_2$~$C_{10}$ hydrocarbon group having at least one alkoxy group, n is an integer from 1 to 60, m is an integer from 1 to 60, X is an integer from 1 to 60, Y is an integer from 1 to 60, Z is an integer from 0 to 300 and a molar ratio of the first group:the second group:the third group:the fourth group is 1~40:1~30:0.5~10:45~90. With respect to a total amount of the conjugated diene monomers and the vinyl aromatic hydrocarbon monomers as 100 parts by weight, an amount of the organic alkali metal compound ranges from 0.01 parts by weight to 0.5 parts by weight and an amount of the polysiloxane compound ranges from 0.01 parts by weight to 1.0 part by weight.

The embodiment of the present invention provides a modified conjugated diene-vinyl aromatic copolymer. The modified conjugated diene-vinyl aromatic copolymer is obtained by polymerizing conjugated diene monomers and vinyl aromatic hydrocarbon monomers to obtain a conjugated diene-vinyl aromatic copolymer and reacting the conjugated diene-vinyl aromatic copolymer with a polysiloxane compound to form the modified conjugated diene-vinyl aromatic copolymer. The polysiloxane compound having a structure represented by formula 1:

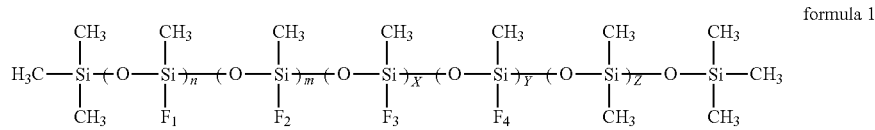

formula 1

Each of $F_1$, $F_2$, $F_3$ and $F_4$ is individually selected from one of a first group, a second group, a third group and a fourth group, and each of $F_1$, $F_2$, $F_3$ and $F_4$ belongs to a different group; the first group is selected from a $C_2$~$C_{10}$ hydrocarbon group having at least one amino group, a $C_2$~$C_{10}$ hydrocarbon group having at least one epoxy group, a $C_2$~$C_{10}$ hydrocarbon group having at least one carbonyl group or a $C_2$~$C_{10}$ hydrocarbon group having at least one alkoxy group; the second group is a $C_2$~$C_{10}$ hydrocarbon group having at least one amino group; the third group is selected from a $C_2$~$C_{10}$ hydrocarbon group having at least one epoxy group, a $C_2$~$C_{10}$ hydrocarbon group having at least one carbonyl group, a $C_2$~$C_{10}$ hydrocarbon group having at least one SiCl group or a $C_2$~$C_{10}$ hydrocarbon group having at least one alkoxy group; the fourth group is selected from a $C_2$~$C_{10}$ hydrocarbon group having at least one aryl group or a $C_2$~$C_{10}$ hydrocarbon group having at least one alkoxy group; n is an integer from 1 to 60, m is an integer from 1 to 60, X is an integer from 1 to 60, Y is an integer from 1 to 60, Z is an integer from 0 to 300 and a molar ratio of the first group:the second group:the third group:the fourth group is 1~40:1~30:0.5~10:45~90. With respect to a total amount of the conjugated diene monomers and the vinyl aromatic hydrocarbon monomers as 100 parts by weight, an amount of the polysiloxane compound ranges from 0.01 parts by weight to 1.0 part by weight.

Based on the above, the present invention provides a polysiloxane compound having four types of group of different functions, so that the modified conjugated diene-vinyl aromatic copolymer through the modification of the above polysiloxane compound has improved mixing compatibility with carbon black and silica. In addition, the tire fabricated by the above-mentioned modified conjugated diene-vinyl aromatic hydrocarbon copolymer(s) can have low rolling resistance and excellent skid resistance.

A detailed description is given in the following embodiments.

DESCRIPTION OF EMBODIMENTS

In the following detailed description, for purposes of explanation, numerous specific details are set forth in order to provide a thorough understanding of the disclosed embodiments.

In the specification, if the particular functional group is not specified to be substituted, the particular functional group can represent a substituted or unsubstituted functional group. For example, "alkyl" represents a substituted or unsubstituted alkyl group. In addition, for a functional group denoted with "$C_X$", which means that the main chain of the group has X carbon atoms.

In the specification, the structure of the compound is sometimes denoted by a skeleton formula. This notation may skip carbon atoms, hydrogen atoms and hydrogen-carbon bonds. Of course, the structural formula drawn with functional groups prevails.

In the specification, phr (part per hundred rubber) is sometimes used as the unit of the amount of raw materials, which is the common term in the field of synthetic rubber and refers to "added parts by weight per 100 parts of rubber (by weight)".

In one embodiment, a polysiloxane compound having a structure represented by formula 1:

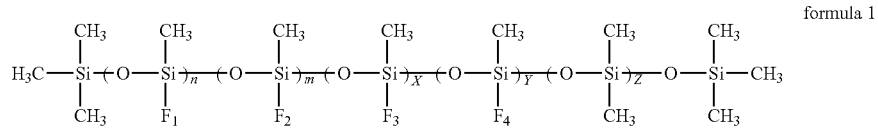

formula 1 wherein each of $F_1$, $F_2$, $F_3$ and $F_4$ is individually selected from one of a first group, a second group, a third group and a fourth group, and each of $F_1$, $F_2$, $F_3$ and $F_4$ belongs to a different group.

Therefore, $F_1$ is selected from the first group, the second group, the third group or the fourth group. $F_2$ is selected from the first group, the second group, the third group or the fourth group. $F_3$ is selected from the first group, the second group, the third group or the fourth group. $F_4$ is selected from the first group, the second group, the third group or the fourth group. $F_1$, $F_2$, $F_3$ and $F_4$ can not be selected from the same group of the four groups. That is, the polysiloxane compound(s) as shown in formula 1 has four different groups, and each of the four groups has the function(s) different to one another.

In another embodiment, the first group may be a $C_2$~$C_{10}$ hydrocarbon group having at least one amino group, a $C_2$~$C_{10}$ hydrocarbon group having at least one epoxy group, a $C_2$~$C_{10}$ hydrocarbon group having at least one carbonyl group or a $C_2$~$C_{10}$ hydrocarbon group having at least one alkoxy group; the second group may be a $C_2$~$C_{10}$ hydrocarbon group having at least one amino group; the third group may be a $C_2$~$C_{10}$ hydrocarbon group having at least one epoxy group, a $C_2$~$C_{10}$ hydrocarbon group having at least one carbonyl group, a $C_2$~$C_{10}$ hydrocarbon group having at least one SiCl group or a $C_2$~$C_{10}$ hydrocarbon group having at least one alkoxy group; and the fourth group may be a $C_2$~$C_{10}$ hydrocarbon group having at least one aryl group or a $C_2$~$C_{10}$ hydrocarbon group having at least one alkoxy group.

More specifically, the $C_2$~$C_{10}$ hydrocarbon group having an amino group may refer to the formula —$C_nH_{2n}$-A, whereas n=2~10 and A is an amino group. The first group, the second group, the third group and the fourth group of the various hydrocarbon structural formulas may also be interpreted in the same way. For example, the $C_2$~$C_{10}$ hydrocarbon group having an epoxy group may refer to the formula —$C_nH_{2n}$—B, whereas n=2~10 and B is an epoxy group.

In another embodiment, the epoxy group may be represented by formula (i):

formula (i)

In another embodiment, the alkoxy group may be ethylene oxide (EO) group, propylene oxide (PO) group, ethylene oxide-propylene oxide group or the like. The above EO group and PO group generally refer to a repeating unit of the polymer structure, as shown in the Table 1.

TABLE 1

| EO group | PO group |
|---|---|
| 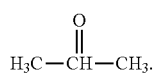 | |

In another embodiment, the carbonyl group may be represented by formula (ii):

$$H_3C-\overset{O}{\overset{\|}{C}H}-CH_3.$$

formula (ii)

In another embodiment, the amino group may be represented by formula —$NR'_2$, wherein R' is hydrogen, an alkyl group or $SiR''_3$, and R" is an alkyl group.

In one embodiment, the first group is a functional group having a high affinity toward silica, and its role is to increase the mixing compatibility of silica with the modified conjugated diene-vinyl aromatic hydrocarbon copolymer. In this embodiment, the first group is an alkoxy group. In one embodiment, the first group is a EO group.

In another embodiment, the second group is a functional group with a high affinity toward carbon black, and its role is to increase the mixing compatibility of carbon black and the modified conjugated diene-vinyl aromatic hydrocarbon copolymer. In this embodiment, the second group is a $C_2$~$C_{10}$ hydrocarbon group having an amino group. In this embodiment, the amino group may be represented by formula —$NR'_2$, wherein R' is hydrogen, an alkyl group or $SiR''_3$, and R" is an alkyl group. In one embodiment, the amino group of the second group is represented by formula (iii):

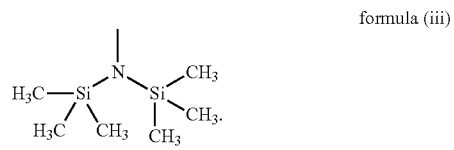

formula (iii)

In another embodiment, the third group is a functional group having good reactivity with the organic alkali metal compound, and its role is to provide good reactivity to the terminal organic alkali metal of the conjugated diene-vinyl aromatic hydrocarbon copolymer during modifying the conjugated diene-vinyl aromatic hydrocarbon copolymer. In this embodiment, the third group may be a $C_2$~$C_{10}$ hydrocarbon group having an epoxy group, a $C_2$~$C_{10}$ hydrocarbon group having a carbonyl group, a $C_2$~$C_{10}$ hydrocarbon group having SiCl group or a $C_2$~$C_{10}$ hydrocarbon group having an alkoxy group. The above $C_2$~$C_{10}$ hydrocarbon group having an epoxy group may be the same as the $C_2$~$C_{10}$ hydrocarbon group having an epoxy group of the first group. The above $C_2$~$C_{10}$ hydrocarbon group having a carbonyl group may be the same as the $C_2$~$C_{10}$ hydrocarbon group having a carbonyl group of the first group. In this embodiment, the epoxy group of the third group may be represented by formula (i):

formula (i)

In another embodiment, the fourth group is an end-capping functional group, and its role is to terminate the hydrosilylation reaction. That is, the addition reaction of the siloxane unit that is to be bonded to the main chain of the polysiloxane compound is ceased. In this embodiment, the fourth group may be a $C_2$~$C_{10}$ hydrocarbon group having an aryl group or a $C_2$~$C_{10}$ hydrocarbon group having an alkoxy group. The above $C_2$~$C_{10}$ hydrocarbon group having an alkoxy group may be the same as the $C_2$~$C_{10}$ hydrocarbon group having an alkoxy group of the third group. In this embodiment, the aryl group of the fourth group may be represented by formula (iv):

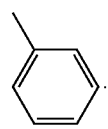

formula (iv)

In one embodiment, n is an integer from 1 to 60, m is an integer from 1 to 60, X is an integer from 1 to 60, Y is an integer from 1 to 60, and Z is an integer from 1 to 300.

In one embodiment, the molar ratio of the first group:the second group:the third group:the fourth group is 1~40:1~30: 0.5~10:45~90. The molar ratio refers to the ratios of the moles of the added starting materials for each group during the synthesis of polysiloxane compound(s).

In one embodiment, the above polysiloxane compound has a structure represented by formula 2:

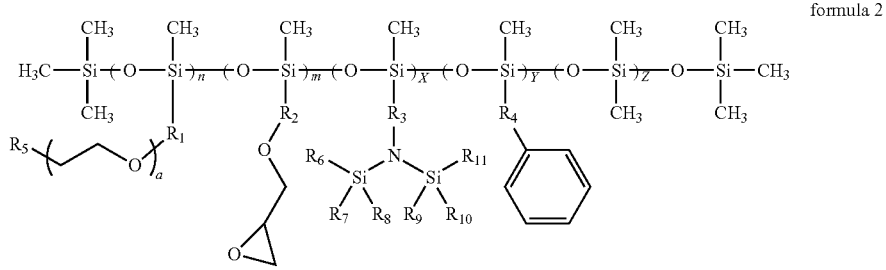

formula 2

In this embodiment, the alkoxy group of the first group, for example, is the EO group.

In this embodiment, n is an integer from 15 to 20, m is an integer from 15 to 20, X is an integer from 1 to 10, Y is an integer from 15 to 20, Z is an integer from 0 to 10 and a is an integer from 4 to 10, $R_1$~$R_4$ is individually a $C_2$~$C_4$ alkyl group, $R_5$ is a $C_1$~$C_3$ alkyl group or a $C_1$~$C_3$ alkoxy group, and $R_6$~$R_{11}$ is individually a $C_1$~$C_3$ alkyl group.

The following is a detail method for producing the modified conjugated diene-vinyl aromatic hydrocarbon copolymer by using the polysiloxane compound as a modifying agent (a modifier).

First, the organic alkali metal compound is reacted with conjugated diene monomers and vinyl aromatic hydrocarbon monomers through polymerization reaction to obtain a conjugated diene-vinyl aromatic hydrocarbon copolymer (also as conjugated diene-vinyl aromatic copolymer). The weight ratio (the ratio by weight) of the conjugated diene monomers and the vinyl aromatic hydrocarbon monomers ranges from 2:1 to 5:1.

With respect to a total amount of the conjugated diene monomers and the vinyl aromatic hydrocarbon monomers as 100 parts by weight, the organic alkali metal compound may be used in an amount of, for example, 0.05 parts by weight to 0.5 parts by weight and the added amount of the polysiloxane compound, for example, ranges from 0.05 parts by weight to 1.0 part by weight. In another embodiment, the polysiloxane compound may be used in an amount of 0.2 parts by weight to 0.5 parts by weight.

The organic alkali metal compound may comprise ethyl lithium, n-propyl lithium, isopropyl lithium, n-butyllithium, n-pentyl lithium, phenyl lithium, tolyl lithium or a combination thereof.

The conjugated diene monomer(s) may comprise 1,3-butadiene, isoprene(2-methyl-1,3-butadiene), 1,3-pentadiene, 2-ethyl-1,3-butadiene, 2,3-dimethyl-butadiene, 2-methyl-pentadiene, 4-methyl-pentadiene, 2,4-hexadiene or the combinations thereof.

The vinyl aromatic hydrocarbon monomer(s) may comprise styrene, alpha-methyl styrene, divinylbenzene or the combinations thereof.

The conjugated diene-vinyl aromatic hydrocarbon copolymer is obtained by the above polymerization reaction comprises conjugated diene repeating units and vinyl aromatic hydrocarbon repeating units. Herein, the term "repeating unit" (or monomer units) refers to structural units formed through the polymerization reaction of the aforementioned conjugated diene monomers or the aforementioned vinyl aromatic hydrocarbon monomers.

The conjugated diene repeating units comprise 1,3-butadiene repeating units, isoprene repeating units, 1,3-pentadiene repeating units, 2-ethyl-1,3-butadiene repeating units, 2,3-dimethyl-butadiene repeating units, 2-methyl-pentadiene repeating units, 4-methyl-pentadiene repeating units, 2,4-hexadiene repeating units or the combinations thereof.

The vinyl aromatic hydrocarbon repeating units comprise styrene repeating units, alpha-methyl styrene repeating units, divinylbenzene repeating units or the combinations thereof.

The conjugated diene monomers may carry out 1,4-polymerization or 1,2-polymerization to form 1,4-polymerized structural units (or vinyl-1,4-structural units, hereinafter referred to as 1,4-structural units) and 1,2-polymerized structural units (or vinyl-1,2-structural units, hereinafter referred to as 1,2-structural units). "1,4-polymerization" refers to bonding of the conjugated diene monomer with other monomers via its 1-position and 4-position carbons. The 1,4-structural units obtained by way of such polymerization can be further divided into cis-forms and trans-forms. Similarly, "1,2-polymerization" refers to bonding of the conjugated diene monomer with other monomers via its 1-position and 2-position carbons. The 1,2-structural unit formed by 1,2-polymerization is the structure having the vinyl group at the side chain(s). The 1,4-structural units may coexist with the 1,2-structural units in the polymer chain. For example, when polymerization of 1,3-butadiene monomers is carried out, 1,2-polybutadiene or 1,4-polybutadiene may be produced. In one embodiment, the 1,2-structural units (1,2-polymerized structural units) amount is 55~70% of the total amount of 1,2-structural units and 1,4-structural units.

In another embodiment, the polymerization reaction of the conjugated diene monomers and vinyl aromatic hydrocarbon monomers may be carried out in the presence of a solvent. The solvent may include a non-polar solvent, for example (but not limited to), aliphatic hydrocarbons such as pentane, hexane, heptane and the like, alicyclic hydrocarbons such as cyclopentane, cyclohexane, methylcyclopentane, methylcyclohexane and the like, aromatic hydrocarbons such as benzene, toluene, xylene and the like or a mixture of the foregoing solvents.

In another embodiment, the polymerization reaction of the conjugated diene monomers and vinyl aromatic hydrocarbon monomers may be carried out in the presence of the microstructural modifying agent. By using the microstructural modifying agent, the conjugated diene monomers and vinyl aromatic hydrocarbon monomers may randomly co-polymerize. The microstructural modifying agent may be a polar compound, and in one embodiment, the microstructural modifying agent can be used as a vinylating agent.

The microstructural modifying agent includes, but not limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxy benzene, 2,2-bis(2-tetrahydrofuryl) propane and the like; tertiary amine compounds such as tetramethylethylenediamine, dipiperidinoethane, trimethylamine, triethylamine, pyridine, quinuclidine and the like; alkali metal alkoxide compounds such as potassium tert-amylate, potassium tert-butoxide, sodium tert-butoxide, sodium tert-amylate and the like; phosphine compounds such as triphenylphosphine; or alkyl or aryl sulfonate compounds. The polar compound may be used alone or in mixture of two or more polar compounds. The used amount of the microstructural modifying agent can be chosen according to the actual needs of its structural adjustment effect.

Next, using the aforementioned polysiloxane compound as a modifier, the synthesized conjugated diene-vinyl aromatic hydrocarbon copolymer is reacted with the polysiloxane compound to generate the modified conjugated diene-vinyl aromatic hydrocarbon copolymer. The structure and nature of the polysiloxane compound(s) used herein can refer to the foregoing embodiments, and will not be described in details again.

In one embodiment, the above-mentioned modified conjugated diene-vinyl aromatic hydrocarbon copolymer may be used as the starting material for rubber articles. The preparing method of the rubber articles comprises mixing the modified conjugated diene-vinyl aromatic hydrocarbon copolymer(s) and the reinforcing agent to obtain the rubber article. The reinforcing agent may be carbon black or silica.

Through using the polysiloxane compound(s) having four types of functional groups of different functionality as the modifier, the obtained modified conjugated diene-vinyl aromatic hydrocarbon copolymer can possess the desired properties, which is beneficial for enhancing the quality of the subsequently formed rubber articles (such as tires).

Synthesis Example of the Modified

The preparing method for the modified conjugated diene-vinyl aromatic hydrocarbon copolymer in embodiment 1 to comparative example 11 as following, 800 g of cyclohexane was added to the reaction tank as a solvent, and the reaction temperature of the system was maintained at 45° C. Then, 0.3 parts by weight (0.64 g) of 2,2-bis(2-tetrahydrofuryl)propane (DTHFP) were added to the reaction tank as the microstructural modifying agent. Then, about 0.05 parts by weight of divinylbenzene (DVB) were added and the mixture was stirred for 10 minutes. 0.1 to 0.2 parts by weight of n-butyllithium were added to the reaction tank as the initiator of the polymerization reaction and n-butyllithium and divinylbenzene are reacted to form divergent stellate structure(s). The molar ratio of the microstructural modifying agent:n-butyl lithium is substantially about 2:1.

Then, 44.7 g of styrene is used as the first monomer(s), 168.3 g of butadiene used as the second monomer(s) was added to the reaction tank for polymerization reaction, and the feeding time is 50 minutes. After the polymerization reaction was carried out for about 55 minutes, 3.5 parts by weight of butadiene monomers (regarded as the end-capping agent) were added as the terminus of the copolymer chain. Therefore, the conjugated diene-vinyl aromatic hydrocarbon copolymer is obtained. This copolymer is sampled and analyzed by using IR or NMR after removing the solvent, the vinyl-1,2-structural unit(s) amount is 63% of the total amount of vinyl-1,2-structural units and vinyl-1,4-structural units, and the styrene repeating unit(s) amount is 21 wt % of the total amount of butadiene monomer units and styrene monomer units.

Then, about 0.3 parts by weight of the polysiloxane compound(s) were added as a modifier, the structure of the polysiloxane compound(s) is represented by formula 2. After the reaction, the modified conjugated diene-vinyl aromatic hydrocarbon copolymer is precipitated by using alcohols (e.g., methanol, ethanol or isopropanol) or removing the solvent using water vapor and then dried.

The modified conjugated diene-vinyl aromatic copolymer has a weight average molecular weight (Mw) of 100,000~700,000 and a number average molecular weight (Mn) of 60,000~400,000, and the modified conjugated diene-vinyl aromatic copolymer has a polydispersity index (PDI, calculated as Mw/Mn) of 1.5~2.0.

The modified conjugated diene-vinyl aromatic copolymer is further made into rubber articles.

The properties of the rubber articles were measured by using the dynamic mechanical analyzer (TA Instruments, model DMA Q800). Measurements were carried out in the tensile loading mode with the measured frequency of 20 Hz. The measured factors are the dynamic storage elastic modulus (E) as well as the loss factor (tan δ). The dynamic storage elastic modulus (E) is measured at 60° C., and a dynamic storage elastic modulus difference (ΔE') is the dynamic storage elastic modulus measured at 0.5% deformation minus the dynamic storage elastic modulus measured at 10% deformation. The lower ΔE', the better compatibility of the carbon black and the rubber composition. The dynamic storage elastic modulus difference (ΔE') is also known for the Payne effect.

The loss factor (tan δ) is measured at 0° C. and 60° C., and a heating rate of this measurement is 3° C. per minute. The measurement of the loss factor at 0° C. may be regarded as a simulation of tire performance on icy roads, and the higher the loss factor is, the better the anti-slippery behavior of the rubber article is. The measurement of the loss factor at 60° C., may be regarded as simulation of tire performance at high speeds, and the lower the loss factor is, the lower the rolling resistance of the rubber article is.

Table 2 shows the compositional ratio of functional groups used in the polysiloxane compound(s) (i.e. the modifier) of the rubber articles in Embodiment 1 to Comparative example 11. Table 3 shows the structures of the starting materials of functional groups. Furthermore, the EO group belongs to the first group, the Amine group belongs to the second group, the Epoxy group belongs to the third group, and the SM group belongs to the fourth group. In addition, the structure of the SM group is the structure of the aforementioned formula (iv).

TABLE 2

| modifying agent | No. of functional groups | molar ratio of functional groups | | | | | | |
|---|---|---|---|---|---|---|---|---|
| | | SIOR | KBM-1003 | BZA | Epoxy | Amine | EO | SM |
| Embodiment 1 | 4 | | | | 1 | 10 | 30 | 59 |
| Embodiment 2 | 4 | | | | 5 | 5 | 5 | 85 |
| Embodiment 3 | 4 | | | | 5 | 10 | 5 | 80 |
| Embodiment 4 | 4 | | | | 5 | 15 | 5 | 75 |
| Comparative example 1 | 3 | 5 | | 30 | | | | 65 |
| Comparative example 2 | 3 | 30 | | 5 | | | | 65 |
| Comparative example 3 | 3 | 30 | | 5 | | | | 65 |
| Comparative example 4 | 3 | | | 50 | 25 | | 25 | |
| Comparative example 5 | 3 | | | 40 | 20 | | 40 | |
| Comparative example 6 | 3 | | | 20 | 20 | | 60 | |
| Comparative example 7 | 3 | 60 | | | 35 | | 5 | |
| Comparative example 8 | 3 | 60 | | | 5 | | 35 | |
| Comparative example 9 | 3 | 60 | | | 20 | | 20 | |
| Comparative example 10 | 3 | | 60 | | 10 | 30 | | |
| Comparative example 11 | 3 | | 60 | | 15 | 25 | | |

TABLE 3

SIOR

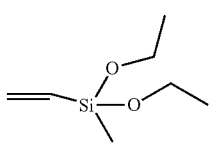

BZA

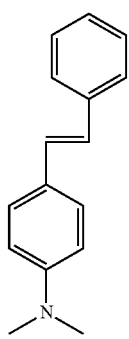 [SMILES: CN(C)c1ccc(/C=C/c2ccccc2)cc1]

KBM-1003

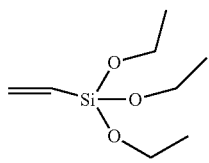

Epoxy

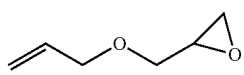

TABLE 3-continued

EO

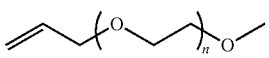

Table 4 shows the evaluation of characteristics of the rubber articles in Embodiment 1 to Comparative example 12. Comparative example 12 is the rubber article made by unmodified conjugated diene-aromatic vinyl copolymer.

TABLE 4

| rubber article | Payne effect | tanδ (0° C.) | tanδ (60° C.) |
|---|---|---|---|
| Embodiment 1 | 3.52 | 0.85 | 0.075 |
| Embodiment 2 | 4.78 | 0.59 | 0.074 |
| Embodiment 3 | 3.96 | 0.62 | 0.070 |
| Embodiment 4 | 3.19 | 0.81 | 0.070 |
| Comparative example 1 | 5.48 | 0.54 | 0.073 |
| Comparative example 2 | 2.40 | 0.65 | 0.083 |
| Comparative example 3 | 4.72 | 0.50 | 0.066 |
| Comparative example 4 | 2.55 | 0.69 | 0.074 |
| Comparative example 5 | 3.18 | 0.67 | 0.068 |
| Comparative example 6 | 5.21 | 0.56 | 0.066 |
| Comparative example 7 | 3.73 | 0.38 | 0.069 |
| Comparative example 8 | 3.75 | 0.59 | 0.075 |
| Comparative example 9 | 3.87 | 0.59 | 0.071 |
| Comparative example 10 | 3.01 | 0.68 | 0.072 |
| Comparative example 11 | 3.69 | 0.63 | 0.070 |

TABLE 4-continued

| rubber article | Payne effect | tanδ (0° C.) | tanδ (60° C.) |
|---|---|---|---|
| Comparative example 12 | 9.48 | 0.38 | 0.093 |

Based on the above, the present invention provides a polysiloxane compound having four types of different functional groups, so that the modified conjugated diene-vinyl aromatic copolymer through the modification of the above polysiloxane compound has improved mixing compatibility with carbon black and silica. In addition, the rubber article fabricated by the above-mentioned modified conjugated diene-vinyl aromatic hydrocarbon copolymer(s) can have low rolling resistance and excellent skid resistance.

While the invention has been described by way of example and in terms of the exemplary embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for preparing a modified conjugated diene-vinyl aromatic copolymer, comprising:
polymerizing an organic alkali metal compound with conjugated diene monomers and vinyl aromatic hydrocarbon monomers to obtain a conjugated diene-vinyl aromatic copolymer, wherein a weight ratio of the conjugated diene monomers and the vinyl aromatic hydrocarbon monomers ranges from 2:1 to 5:1; and
reacting the conjugated diene-vinyl aromatic copolymer with a polysiloxane compound to form the modified conjugated diene-vinyl aromatic copolymer, wherein the polysiloxane compound having a structure represented by formula 1:

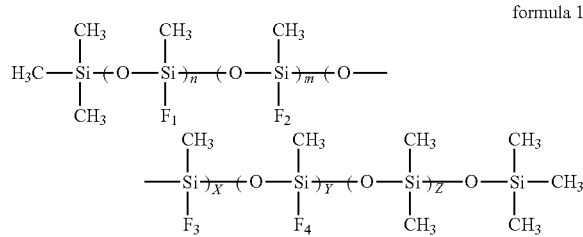

formula 1 wherein each of $F_1$, $F_2$, $F_3$ and $F_4$ is different from each other, wherein $F_1$ and $F_2$ is individually selected from the group consisting of a $C_2$~$C_{10}$ hydrocarbon group having at least one epoxy group, a $C_2$~$C_{10}$ hydrocarbon group having at least one carbonyl group, a $C_2$~$C_{10}$ hydrocarbon group having at least one alkoxy group and a $C_2$~$C_{10}$ hydrocarbon group having at least one SiCl group, $F_3$ is a $C_2$~$C_{10}$ hydrocarbon group having at least one amino group, $F_4$ is selected from the group consisting of a $C_2$~$C_{10}$ hydrocarbon group having at least one alkoxy group and a $C_2$~$C_{10}$ hydrocarbon group having at least one aryl group, n is an integer from 1 to 60, m is an integer from 1 to 60, X is an integer from 1 to 60, Y is an integer from 1 to 60, and Z is an integer from 0 to 300.

2. The method of claim 1, wherein with respect to a total amount of the conjugated diene monomers and the vinyl aromatic hydrocarbon monomers as 100 parts by weight, an amount of the organic alkali metal compound ranges from 0.01 parts by weight to 0.5 parts by weight and an amount of the polysiloxane compound ranges from 0.01 parts by weight to 1.0 part by weight.

3. The method of claim 1, wherein the polysiloxane compound has a structure represented by formula 2:

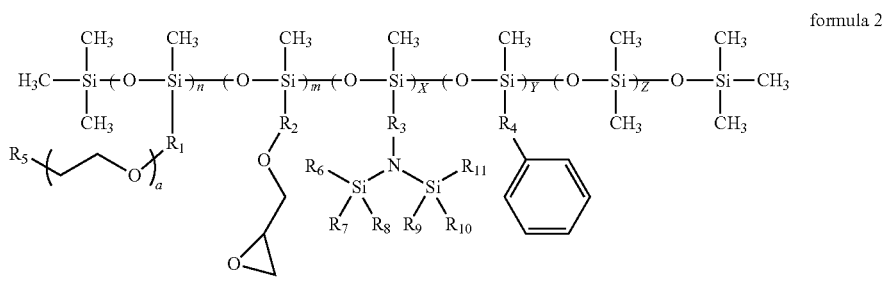

formula 2 wherein n is an integer from 15 to 20, m is an integer from 15 to 20, X is an integer from 1 to 10, Y is an integer from 15 to 20, Z is an integer from 0 to 10 and a is an integer from 4 to 10, $R_1$~$R_4$ is individually a $C_2$~$C_4$ alkyl group, $R_5$ is a $C_1$~$C_3$ alkyl group or a $C_1$~$C_3$ alkoxy group, and $R_6$~$R_{11}$ is individually a $C_1$~$C_3$ alkyl group.

4. The method of claim 1, further comprising adding a microstructural modifying agent during the reaction of the conjugated diene monomers and the vinyl aromatic hydrocarbon monomers.

5. The method of claim 4, wherein with respect to the total amount of the conjugated diene monomers and the vinyl aromatic hydrocarbon monomers as 100 parts by weight, an amount of the microstructural modifying agent ranges from 0.05 parts by weight to 0.5 parts by weight.

6. The method of claim 4, wherein the microstructural modifying agent includes an ether, a tertiary amine compound, an alkali metal alkoxide compound, a phosphine compound, an alkyl sulfonate compound, an aryl sulfonate compound or the combinations thereof.

7. The method of claim 1, wherein the conjugated diene monomers include 1,3-butadiene, isoprene, 1,3-pentadiene, 2-ethyl-1,3-butadiene, 2,3-dimethyl-butadiene, 2-methyl-pentadiene, 4-methyl-pentadiene, 2,4-hexadiene or the combinations thereof.

8. The method of claim 1, wherein the vinyl aromatic hydrocarbon monomers include styrene, alpha-methyl styrene, divinylbenzene or the combinations thereof.

9. A modified conjugated diene-vinyl aromatic copolymer, wherein the modified conjugated diene-vinyl aromatic copolymer is obtained by:

polymerizing conjugated diene monomers and vinyl aromatic hydrocarbon monomers to obtain a conjugated diene-vinyl aromatic copolymer; and reacting the conjugated diene-vinyl aromatic copolymer with a polysiloxane compound to form the modified conjugated diene-vinyl aromatic copolymer, wherein the polysiloxane compound having a structure represented by formula 1:

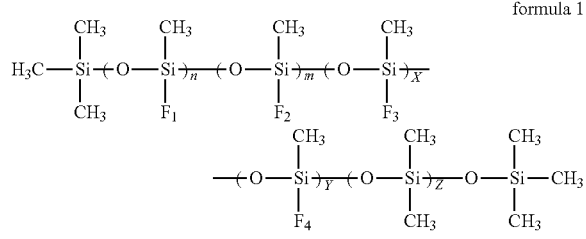

formula 1 wherein each of $F_1$, $F_2$, $F_3$ and $F_4$ is different from each other, wherein $F_1$ and $F_2$ is individually selected from the group consisting of a $C_2$~$C_{10}$ hydrocarbon group having at least one epoxy group, a $C_2$~$C_{10}$ hydrocarbon group having at least one carbonyl group, a $C_2$~$C_{10}$ hydrocarbon group having at least one alkoxy group and a $C_2$~$C_{10}$ hydrocarbon group having at least one SiCl group, $F_3$ is a $C_2$~$C_{10}$ hydrocarbon group having at least one amino group, $F_4$ is selected from the group consisting of a $C_2$~$C_{10}$ hydrocarbon group having at least one alkoxy group and a $C_2$~$C_{10}$ hydrocarbon group having at least one aryl group, n is an integer from 1 to 60, m is an integer from 1 to 60, X is an integer from 1 to 60, Y is an integer from 1 to 60, and Z is an integer from 0 to 300.

10. The copolymer of claim 9, wherein with respect to a total amount of the conjugated diene monomers and the vinyl aromatic hydrocarbon monomers as 100 parts by weight, an amount of the polysiloxane compound ranges from 0.01 parts by weight to 1.0 part by weight.

11. The copolymer of claim 9, wherein the conjugated diene monomers are polymerized to form 1,2-polymerized structural units and 1,4-polymerized structural units, and the 1,2-polymerized structural units account for 55%~70% of a total amount of the 1,2-polymerized structural units and the 1,4-polymerized structural units.

12. The copolymer of claim 9, wherein the conjugated diene monomers account for 74 wt %~84 wt % of a total amount of the conjugated diene-vinyl aromatic copolymer, while the vinyl aromatic hydrocarbon monomers account for 16 wt %~26 wt % of the total amount of the conjugated diene-vinyl aromatic copolymer.

13. The copolymer of claim 9, wherein the modified conjugated diene-vinyl aromatic copolymer has a weight average molecular weight of 100,000~700,000, and has a number average molecular weight of 60,000~400,000.

14. The copolymer of claim 9, wherein the modified conjugated diene-vinyl aromatic copolymer has a polydispersity index (PDI) of 1.5~2.0.

15. The copolymer of claim 9, wherein the first group is selected from a $C_2$~$C_{10}$ hydrocarbon group having ethylene oxide group, a $C_2$~$C_{10}$ hydrocarbon group having propylene oxide group or a $C_2$~$C_{10}$ hydrocarbon group having ethylene oxide-propylene oxide group.

16. The copolymer of claim 9, wherein the at least one amino group of the second group is represented by formula (iii):

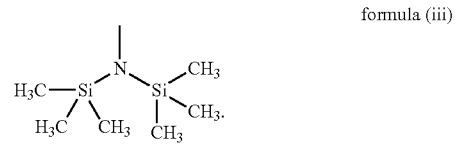

formula (iii)

17. The method of claim 1, wherein each of $F_1$, $F_2$, $F_3$ and $F_4$ is different from each other, $F_1$ and $F_2$ is individually selected from the group consisting of a $C_2$~$C_{10}$ hydrocarbon group having at least one alkoxy group and a $C_2$~$C_{10}$ hydrocarbon group having at least one epoxy group, $F_3$ is a $C_2$~$C_{10}$ hydrocarbon group having at least one amino group, $F_4$ is a $C_2$~$C_{10}$ hydrocarbon group having at least one aryl group, and a molar ratio of alkoxy group:amino group:epoxy group: aryl group is 1~40:1~30:0.5~10:45~90.

18. The copolymer of claim 9, wherein each of $F_1$, $F_2$, $F_3$ and $F_4$ is different from each other, $F_1$ and $F_2$ is individually selected from the group consisting of a $C_2$~$C_{10}$ hydrocarbon group having at least one alkoxy group and a $C_2$~$C_{10}$ hydrocarbon group having at least one epoxy group, $F_3$ is a $C_2$~$C_{10}$ hydrocarbon group having at least one amino group, $F_4$ is a $C_2$~$C_{10}$ hydrocarbon group having at least one aryl group, and a molar ratio of alkoxy group:amino group:epoxy group: aryl group is 1~40:1~30:0.5~10:45~90.

19. The copolymer of claim 9, wherein the polysiloxane compound has a structure represented by formula 2:

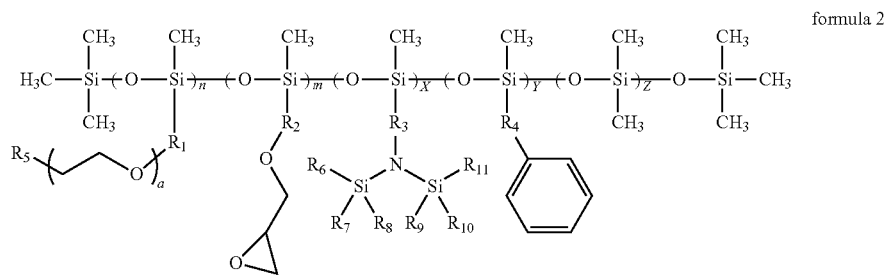

formula 2 wherein n is an integer from 15 to 20, m is an integer from 15 to 20, X is an integer from 1 to 10, Y is an integer from 15 to 20, Z is an integer from 0 to 10 and a is an integer from 4 to 10, $R_1$~$R_4$ is individually a $C_2$~$C_4$ alkyl group, $R_5$ is a $C_1$~$C_3$ alkyl group or a $C_1$~$C_3$ alkoxy group, and $R_6$~$R_{11}$ is individually a $C_1$~$C_3$ alkyl group.

* * * * *